United States Patent
Trojer et al.

(10) Patent No.: US 9,699,013 B2
(45) Date of Patent: Jul. 4, 2017

(54) BASEBAND PROCESSING OF TDD SIGNALS

(75) Inventors: Elmar Trojer, Täby (SE); Thomas Magesacher, Bromma (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 121 days.

(21) Appl. No.: 14/411,528

(22) PCT Filed: Jun. 29, 2012

(86) PCT No.: PCT/SE2012/050743
§ 371 (c)(1),
(2), (4) Date: Dec. 29, 2014

(87) PCT Pub. No.: WO2014/003620
PCT Pub. Date: Jan. 3, 2014

(65) Prior Publication Data
US 2015/0180693 A1  Jun. 25, 2015

(51) Int. Cl.
| H04L 5/14 | (2006.01) |
| H04L 27/26 | (2006.01) |
| H04J 4/00 | (2006.01) |
| H04L 5/02 | (2006.01) |

(52) U.S. Cl.
CPC .............. H04L 27/263 (2013.01); H04J 4/00 (2013.01); H04L 5/023 (2013.01)

(58) Field of Classification Search
CPC .................................................... H04L 27/263
USPC ........................................................ 370/249
See application file for complete search history.

(56) References Cited

U.S. PATENT DOCUMENTS

| 6,990,062 B2 | 1/2006 | Greaves et al. |
| 2002/0034159 A1* | 3/2002 | Greaves .................. H04L 5/143 370/208 |

OTHER PUBLICATIONS

Gunther, Jacob H., "Simultaneous DFT and IDFT of Real N-Point Sequences", IEEE Signal Processing Letters, vol. 9, No. 8, Aug. 2002, 245-246.
Chi, Hsiang-Feng et al., "A Cost-Effective Memory-Based Real-Valued FFT and Hermitian Symmetric IFFT Processor for DMT-Based Wire-Line Transmission Systems", IEEE 2005, 6006-6009.
Fan, Andong et al., "Simultaneous Calculation of DFT and IDFT of Real Two-Dimensional Sequences and Its Application in Digital Image Watermark", IEEE, 2008 Congress on Image and Signal Processing, 730-733.
Maes, Jochen et al., "Pushing the Limits of Copper—Paying the road to FTTH", IEEE ICC 2012—Selected Areas in Communications Symposium, 3149-3153.
Smith, Winthrop W. et al., "Handbook of real-time fast Fourier transforms", Chapter 2: The Discrete Fourier Transform, IEEE Press, 1995, 9-25.
Sorensen, Henrik V. et al., "Real-Valued Fast Fourier Transform Algorithms", IEEE Transactions on Acoustics, Speech, and Signal Processing, vol. ASSP-35, No. 6, Jun. 1987, 849-863.

(Continued)

Primary Examiner — Shripal Khajuria
(74) Attorney, Agent, or Firm — Patents on Demand P.A.; Brian K. Buchheit; Scott M. Garrett

(57) ABSTRACT

Transceiver device and method therein, for baseband processing of signals associated with TDD communication over wire lines. The method involves use of a single burst I/O N-point complex FFT kernel for baseband processing of receive and transmit signal blocks, where the processing involves simultaneously performing a respective FFT or IFFT of two N-sample signal blocks.

13 Claims, 12 Drawing Sheets

(56) References Cited

OTHER PUBLICATIONS

Unknown, Author, "Unified high-speed wireline-based home networking transceivers—System architecture and physical layer specification", Telecommunication Standardization Sector of International Telecommunication Union, G.9960, Series G: Transmission Systems and Media, Digital Systems and Networks Access networks—In premises networks, Dec. 2011, 1-160.

* cited by examiner

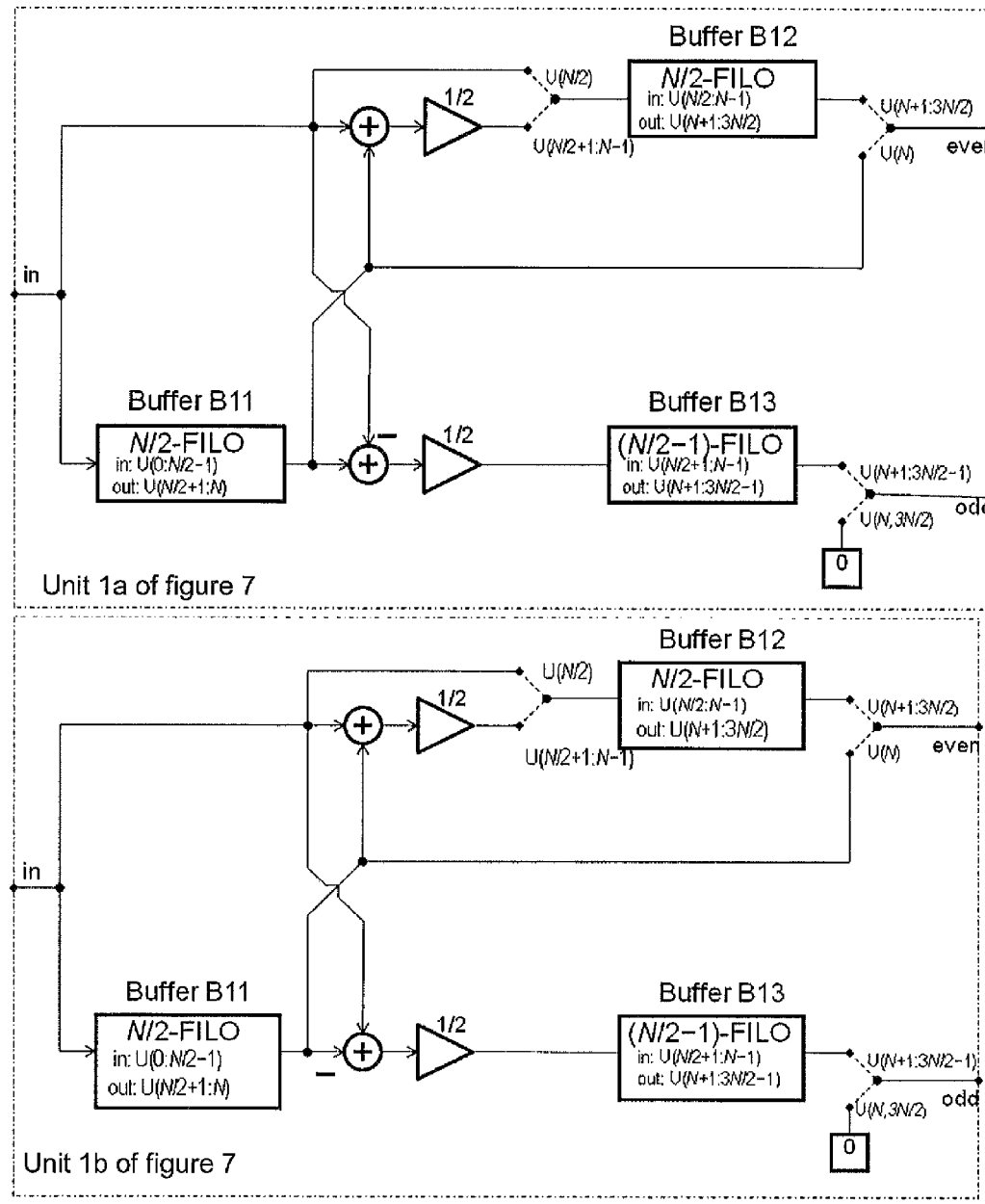
Figure 9a (top) and Figure 9b (bottom)

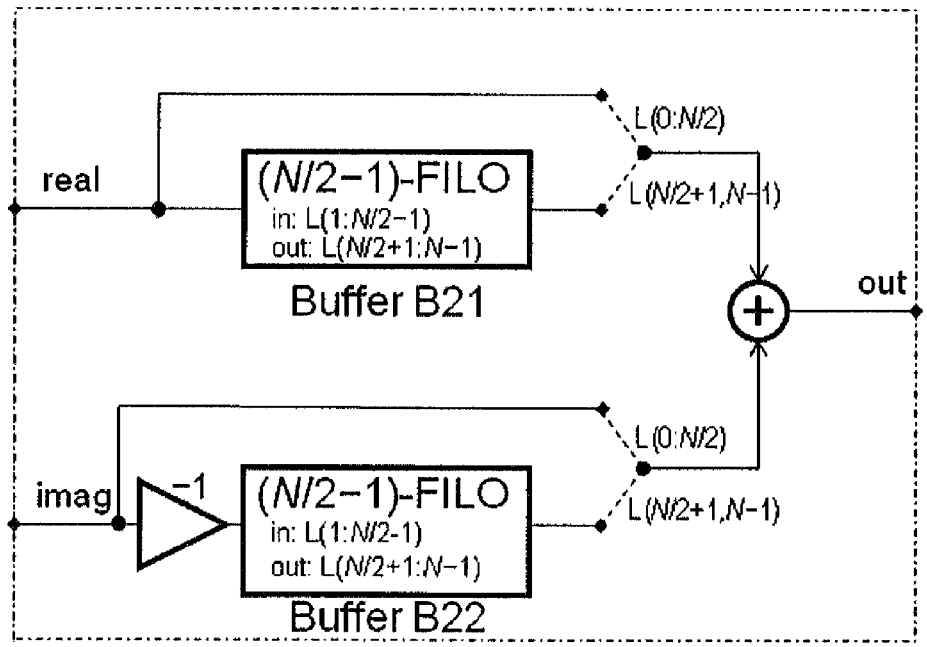
Unit 2a of figure 11
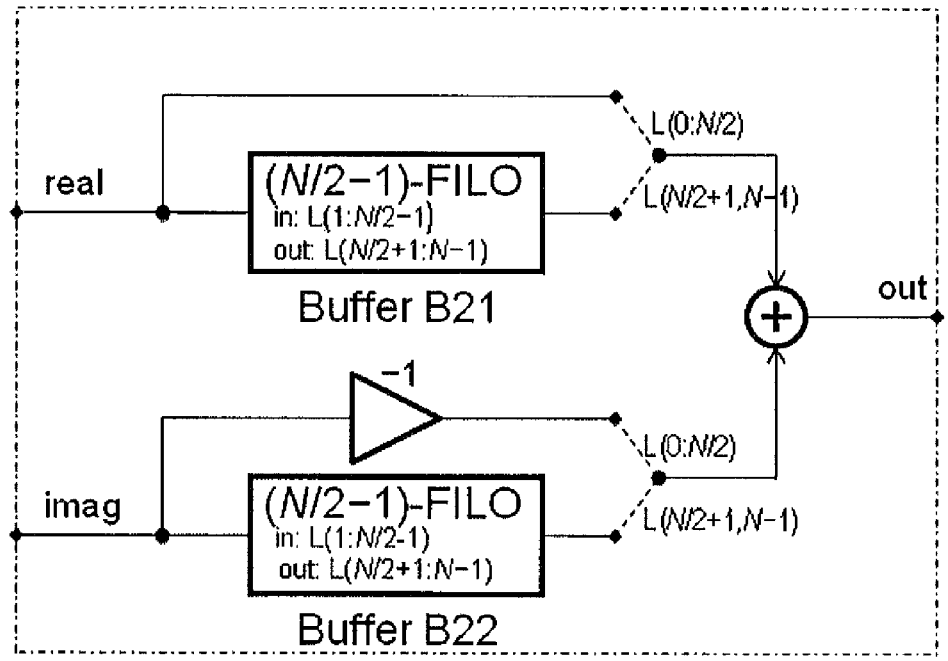
Unit 2b of figure 11 and 14
Figure 12a (top) and Figure 12b (bottom)

BASEBAND PROCESSING OF TDD SIGNALS

TECHNICAL FIELD

The herein suggested solution relates to the field of discrete Fourier transform based baseband communication systems, often referred to as discrete multi-tone (DMT) systems, in which transmit and receive signals are separated in time, i.e. using time-division duplexing (TDD).

BACKGROUND

Copper transmission link technologies such as xDSL are providing, as of today, access broadband services to 286 million subscribers worldwide. Different generations of DSL technology such as ADSL, ADSL2(+), VDSL and VDLS2 provide data rates in the range from several Mb/s up to 100 Mb/s over ranges from 1 km to 8 km. Recently, the need for Gigabit speeds on telephone-grade copper has arisen for broadband access, home networking, as well as 4G mobile network backhaul, such as e.g. LTE S1/X2 interface backhaul.

New generations of DSL-like system can provide this capacity on very short lines/loops in the area of 50-200 meters. Such loops provide 100 to 200 MHz of bandwidth for data transmission, as compared to earlier maximum bandwidths of about 30 MHz for legacy systems. Unlike classical DSL systems transmitting uplink and downstream data in different bands of the copper in a frequency-division duplexing scheme (FDD), Gigabit DSL utilizes more hardware-friendly time-division-duplexing (TDD), where upstream and downstream data is utilizing the whole copper spectrum in a time-shared manner—i.e. the transceiver either transmits or receives at a given point in time Block transmission using the Fast Fourier Transform (FFT) and its inverse, IFFT, for modulation and demodulation, respectively, is the dominating modulation scheme in today's communication systems. This modulating scheme is often referred to as multicarrier modulation. One of the two most important variants of multicarrier modulation is passband transmission using complex-valued transmit/receive signals, which is referred to as orthogonal frequency division multiplexing (OFDM). OFDM is used, for example, in wireless communication systems, such as LTE. The second one is baseband transmission using real-valued transmit/receive signals, which is referred to as DMT. DMT is used, for example, in wireline communication systems, such as xDSL systems using e.g. copper cables.

An FFT is an efficient method to compute a discrete Fourier transform $X_k$ of $x_n$ given by $$X_k = c_{FFT} \Sigma_n x_n \exp(-j2\pi kn/N)$$

where $c_{FFT}$ is a scaling factor.

An IFFT is an efficient method to compute an inverse discrete Fourier transform $x_n$ of $X_k$ given by $$x_n = c_{IFFT} \Sigma_k X_k \exp(j2\pi kn/N)$$

where $c_{IFFT}$ is a scaling factor.

A typical choice is $c_{FFT}=1$ in combination with $c_{IFFT}=1/N$; many mathematical computation packages like, for example, MATLAB, use this pair. Another typical choice is $c_{FFT}=N^{-1/2}$ in combination with $c_{IFFT}=N^{-1/2}$, which preserves the average per-block power before and after the transform. However, other choices are possible. In an actual implementation, $c_{FFT}$ and $c_{IFFT}$ can for example be influenced by the number representation scheme and/or the required precision for numerical representation, or can also include other scaling factors stemming form one or more blocks in the transceiver chain.

The terms "discrete Fourier transform" and "FFT" used hereinafter refer to transforms with an arbitrary scaling value $c_{FFT}$. The terms "inverse discrete Fourier transform" and "IFFT" used hereinafter refer to transforms with an arbitrary scaling value $c_{IFFT}$. For the exemplifying description used hereinafter, the factors $c_{FFT}=1$ and $c_{IFFT}=1/N$ are used. The described method and device, however, can be used with any values for $c_{FFT}$ and $c_{IFFT}$.

Simultaneous transmission and reception of signals requires a scheme for separating the two signals. Separation in time, also referred to as TDD, is a suitable method for low-complexity, and thus low-cost, transceiver implementations. The cost can be kept low, e.g. since there is a reduced need for echo cancellation when using TDD, as compared to when using frequency division. Examples of TDD communication systems include e.g. transmission over any kind of copper transmission media, such as twisted pair, CAT5, etc. TDD systems may be used for various applications providing various services, such as e.g. Internet access and base-station backhaul. The communication may be, and is being, standardized in different variants, such as G.fast and G.hn, but may also be used in different non-standardized forms.

Discrete Fourier transform based baseband communication systems require access to equipment suitable for performing FFT and IFFT. While direct implementation of an N-point discrete Fourier transform sum requires $N^2$ significant operations, dedicated FFT algorithms have a complexity in the order of N log N significant operations. Exact numbers are strongly dependent on the actual implementation. From a hardware-implementation perspective, there are two fundamentally different architectures for FFT/IFFT implementation, which are also illustrated in FIG. 1 and FIG. 2:

1. Pipelined input/output (I/O): also denoted "streaming I/O". Implementing the FFT algorithm in a pipeline fashion allows continuous operation where input and output samples of blocks continuously enter and leave the FFT providing unit one by one at a clock frequency, which equals the block frequency divided by the block length in samples. Thus, it takes one block length to clock in (or clock out) an entire block, as illustrated in FIG. 1. Pipelined architectures are costly in terms of logic and memory but allow continuous transformation of blocks without gaps.
2. Burst I/O: Both input blocks and output blocks are buffered before (load) and after (unload) the actual transform, respectively. Loading and unloading of buffers can be done simultaneously, as illustrated in FIG. 2. Burst I/O FFTs are cheap in terms of logic and memory, but require gaps, 202, of one block length between transforms for loading/unloading the buffers.

For systems with long blocks, for example, emerging wireline standards proposed values for N in the order of $10^4$, FFT/IFFT processing dominates complexity in multicarrier transceivers. In state of the art architectures, the FFT block in a transceiver device supports streaming I/O capability in order to be able to perform a transform in any symbol period. The streaming I/O FFT block is very expensive in terms of hardware resources.

SUMMARY

It would be desirable to reduce complexity and hardware costs for transceiver equipment. It is an object of the herein suggested technology to reduce the complexity and thereby the hardware cost, of transceiver equipment. Herein it is suggested to use a single burst I/O FFT kernel or architecture for providing multicarrier modulation and/or demodulation of two N-sample signal blocks. It is anticipated that the hardware cost related to the baseband multicarrier modulation and demodulation could be reduced by about 50% by use of the herein suggested solution, as compared to prior art solutions.

In the herein suggested solution, the complexity of multicarrier-modulation/demodulation, that is, IFFT/FFT processing, in baseband TDD multicarrier transceivers is reduced by the exploiting of:

burst I/O FFT processing with its inherently low complexity.

simultaneous computation of real-valued FFTs/IFFTs sharing the same hardware block.

The simultaneous computation using a single burst I/O complex-valued FFT is enabled by use of low-complexity pre- and post processing, which will be further described herein.

According to a first aspect, a method is provided for baseband processing of signals associated with TDD communication over one or more wire lines. The method is to be performed by a transceiver operable to communicate over wire lines. The method comprises combining two signal blocks, A and B, each comprising N samples, into a signal X comprising N complex points. Each of the two blocks is either a real-valued N-sample time-domain receive signal block $r_n$, or a complex Hermitian-symmetric N-sample frequency-domain transmit signal block $T_k$. The method further comprises performing a complex FFT on the signal X, using a single burst I/O N-point complex FFT kernel, thus providing a signal $X'_{CFFT}$ comprising N complex points. Further, an N-point discrete Fourier transform or N-point inverse discrete Fourier transform, A' and B', for the signal blocks A and B, from the signal $X'_{CFFT}$.

According to a second aspect, a transceiver is provided, for baseband processing of signals associated with TDD communication over one or more wire lines. The transceiver comprises a combining unit, adapted to combine two signal blocks, A and B, each comprising N samples, into a signal X comprising N complex points, wherein each of the two blocks A and B is either a real-valued N-sample time-domain receive signal block $r_n$, or a complex Hermitian-symmetric N-sample frequency-domain transmit signal block $T_k$. The transceiver further comprises a burst I/O N-point complex FFT kernel, adapted to perform a complex FFT on the signal X, thus providing a signal $X'_{CFFT}$ comprising N complex points. The transceiver further comprises a deriving unit, adapted to derive a respective N-point discrete Fourier transform or N-point inverse discrete Fourier transform, A' and B', for the signal blocks A and B, from the signal $X'_{CFFT}$.

The above method and transceiver device enables a reduction of hardware cost, as compared to previously known methods and transceiver devices.

The above method and transceiver device may be implemented in different embodiments. Examples of the converting and deriving will be described in detail herein and in the appendix.

According to a third aspect, the use of a single burst I/O N-point complex FFT kernel in a transceiver, for simultaneous baseband processing of transmit and/or receive signal blocks associated with TDD multicarrier communication over one or more wire lines, wherein the processing involves simultaneously performing a respective FFT or IFFT of two signal blocks.

According to a fourth aspect, a computer program is provided, which comprises computer readable code means, which when run in a transceiver according to the second aspect above causes the transceiver to perform the corresponding method according to the first aspect above.

According to a fifth aspect, a computer program product is provided, comprising a computer program according to the fourth aspect

BRIEF DESCRIPTION OF THE DRAWINGS

The suggested technology will now be described in more detail by means of exemplifying embodiments and with reference to the accompanying drawings, in which:

FIGS. 9a-b are signal-flow diagrams illustrating exemplifying computations and corresponding timing of Unit1a and Unit1b, i.e. the even/odd sequence splitters, shown in FIG. 7.

FIGS. 12a-b are signal-flow diagrams illustrating computations and corresponding timing of Unit2a and Unit 2b shown in FIG. 11.

DETAILED DESCRIPTION

Figure 1:
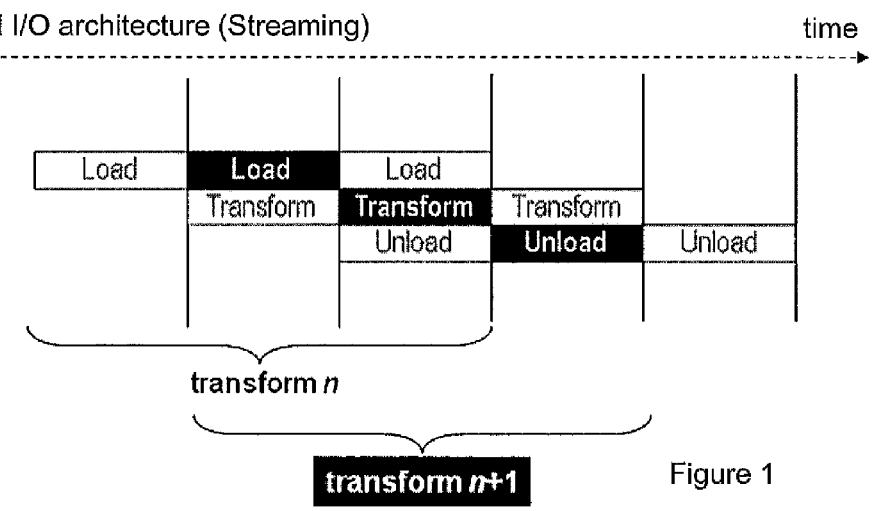
FIG. 1 illustrates so-called pipelined, or streaming, I/O architecture, according to the prior art.
Figure 2:
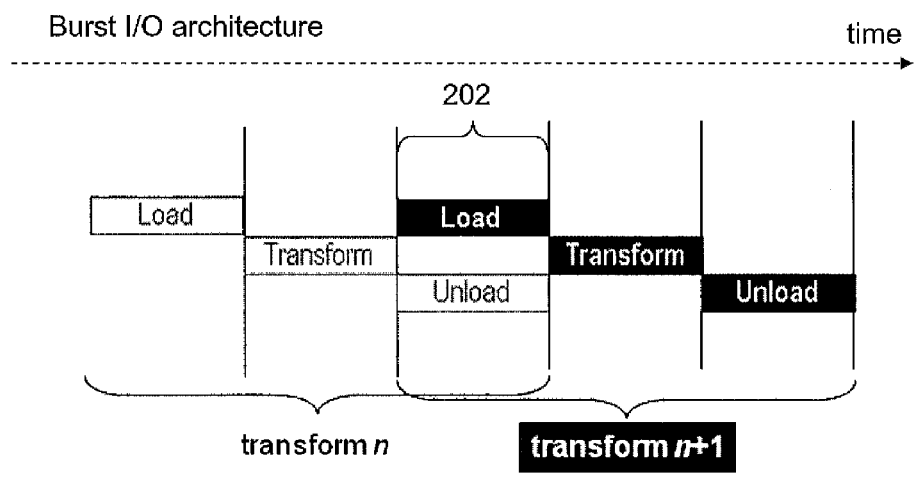
FIG. 2 illustrates so-called burst I/O architecture, according to the prior art.
Figure 3:
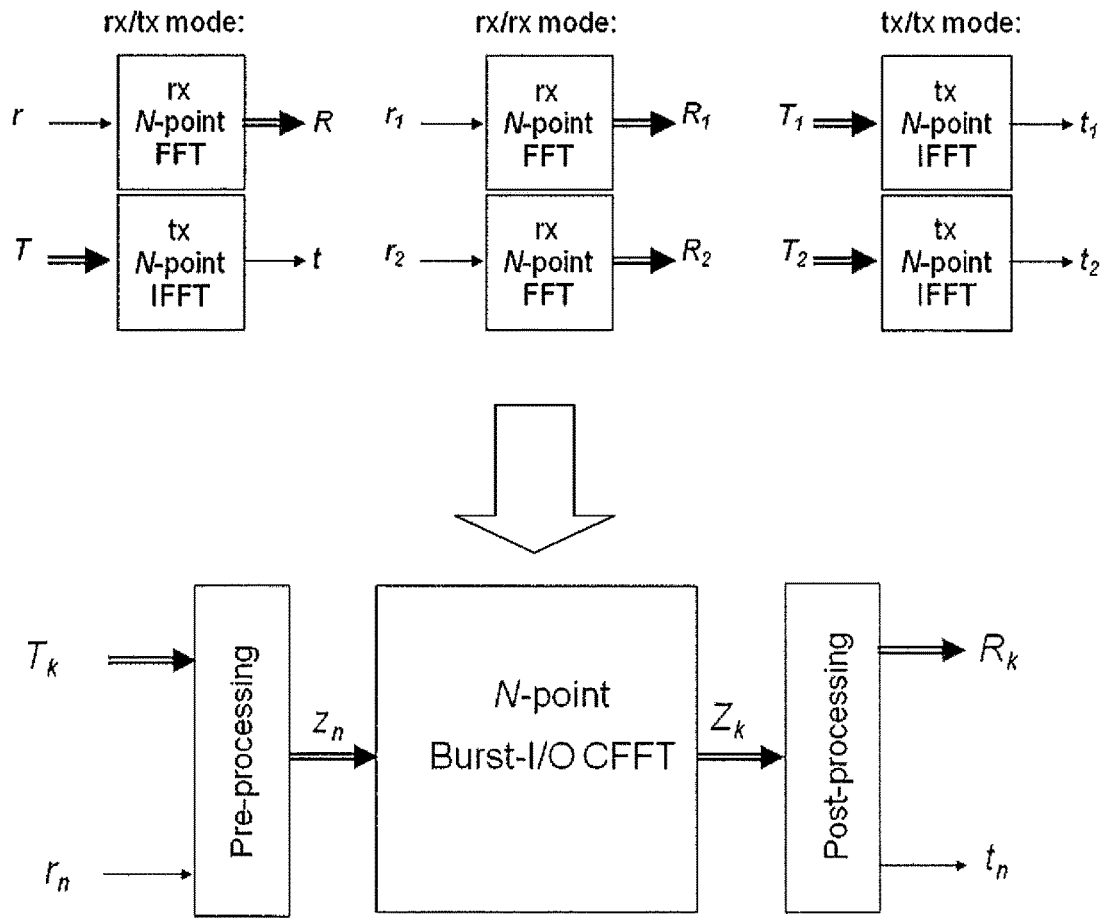
FIG. 3 illustrates the functional purpose of the multicarrier transceiver in its three modes, rx/tx mode, rx/rx mode and tx/tx mode.

In the following description, the time-domain multicarrier block length in samples, which is equal to the number of frequency-domain subcarriers, N, is assumed to be even, since odd block lengths N are practically never used in real systems. However, the principles described herein could be extended to odd block lengths if desired.

A DMT multicarrier transceiver has two basic functions:
1. Transmit (tx): a complex-valued frequency-domain transmit block T is transformed into a real-valued time-domain transmit block t, which is achieved by applying an IFFT.
2. Receive (rx): a real-valued time-domain receive block r is transformed into a complex-valued frequency-domain receive block R, which is achieved by applying an FFT.

In the solution described herein, pairs of transmit and/or receive blocks in a TDD system are processed simultaneously. In a TDD system, the transceiver either transmits or receives at a given time, but never does both at the same time. Simultaneous processing of pairs of blocks in a TDD system leads to processing gaps, i.e. periods of time during which neither FFT processing nor IFFT processing is required. A great advantage of the solution described herein is that it involves that the transceiver employs a single N-point burst I/O FFT, unit, hereinafter referred to as CFFT, for the simultaneous processing of blocks. The processing gaps are exploited for loading input into the CFFT unit and unloading output out of the CFFT unit. Thereby, seamless transmission/reception in a TDD system is achieved by using a single N-point burst I/O FFT unit, in contrast to using one or even two pipelined I/O FFT units.

Regarding the terminology, the term "sample" and "point" are both used to refer to a signal point, as in "N-sample" or "N-point". Herein, "sample" will be used in relation to the receive and transmit blocks r and T, and the term "point" will be used in relation to the intermediate signals, z, Z, and mostly in relation to the transformed signals R and t. However, the term "point" could alternatively be used also for the samples of the receive and transmit blocks. Correspondingly, the term "sample" could be used for other signal points.

The herein suggested transceiver has three modes of operation (illustrated in FIGS. 4 and 5a-c):
1. In a mode hereinafter referred to as rx/tx mode, the transceiver uses a single N-point burst I/O FFT unit for simultaneous FFT-processing of one time-domain receive block r, yielding the frequency-domain block R, and IFFT-processing of one frequency-domain transmit block T yielding the time-domain block t. That is, rx/tx mode involves simultaneous multicarrier modulation of a transmit block and multicarrier demodulation of a receive block. The rx/tx mode is also schematically illustrated in FIG. 5a, showing a time-domain receive block r 501a and a frequency-domain block R, 505a; a frequency-domain transmit block T, 502a and a time-domain block t, 506a
2. In a mode hereinafter referred to as rx/rx mode, the transceiver uses a single N-point burst I/O FFT unit for simultaneous FFT-processing of two time-domain receive blocks $r_1$ and $r_2$ yielding the frequency-domain blocks $R_1$ and $R_2$, respectively. That is, the rx/rx mode involves simultaneous multicarrier demodulation of two receive blocks. FIG. 5b illustrates the blocks $r_1$, 501b; $r_2$, 502b; $R_1$, 505b and $R_2$, 506b.
3. In a mode hereinafter referred to as tx/tx mode, the transceiver uses a single N-point burst I/O FFT unit for simultaneous processing two frequency-domain transmit blocks $T_1$ and $T_2$ yielding the time-domain transmit blocks $t_1$ and $t_2$, respectively That is, the tx/tx mode involves simultaneous multicarrier modulation of two transmit blocks. FIG. 5c illustrates the blocks $T_1$, 501c; $T_2$, 502c; $t_1$, 505c and $t_2$, 506c.

Depending on the desired ratio between number of transmitted blocks and number of received blocks per time unit, the transceiver is operating in one of the above modes or switches between modes. The notation and mathematical expressions for one exemplifying implementation of the suggested solution is provided in the appendix to this description.

Figure 4:
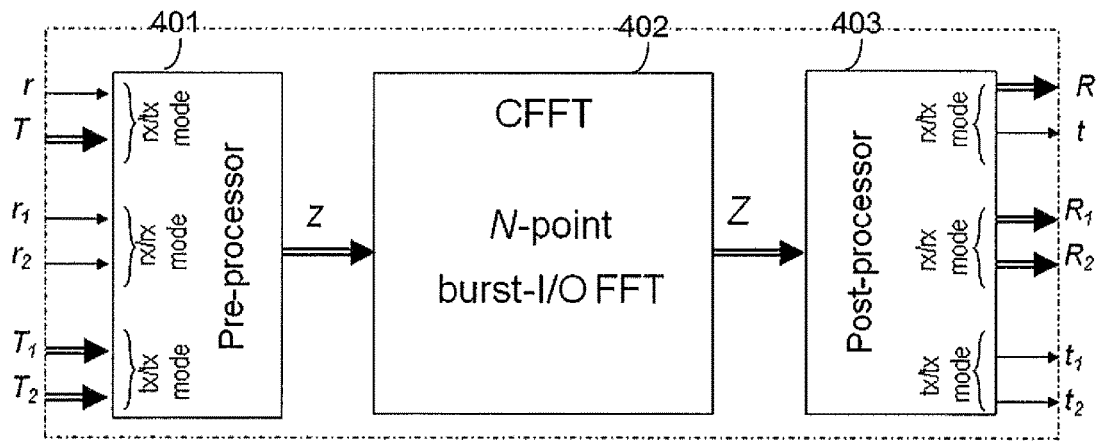
FIG. 4 shows a block diagram of an exemplifying transceiver realizing the functionality illustrated in FIG. 3.
Figure 5A:
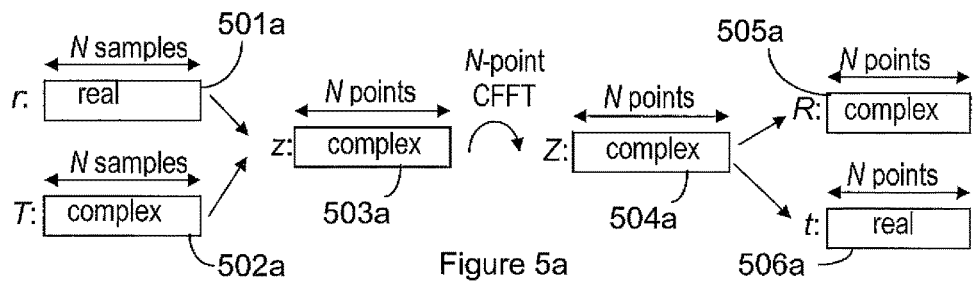
FIGS. 5a-c are illustrations of the signal blocks and actions associated with the different modes, rx/tx (a), rx/rx (b), and tx/tx (c).
Figure 5B:
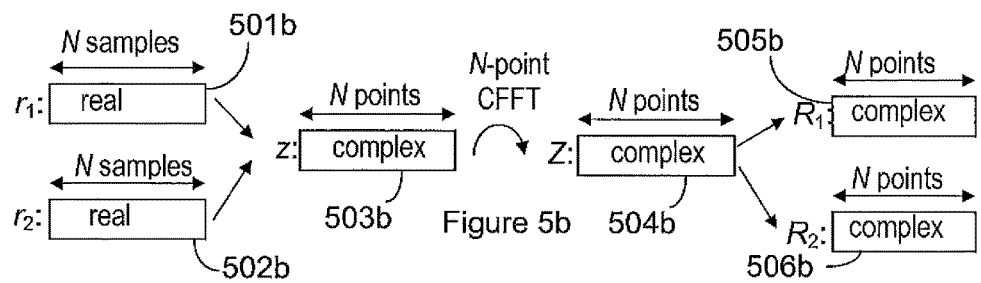
Figure 5C:
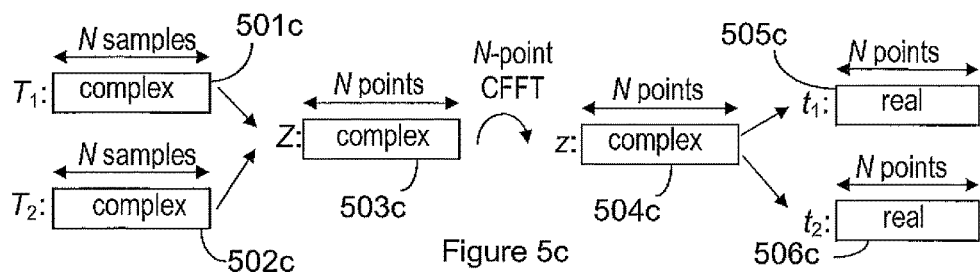

FIG. 4 shows a schematic block diagram of a transceiver comprising a pre-processor 401 with input r and T in rx/tx mode, or, $r_1$ and $r_2$ in rx/rx mode, or, $T_1$ and $T_2$ in tx/tx mode yielding the length-N, i.e. N-point, CFFT-input z. The figure also shows an N-point complex-valued to N-point complex-valued FFT (CFFT) in burst I/O architecture 402 computing:

$$Z(k) = \sum_{n=0}^{N-1} z(n)e^{-j2\pi kn/N}, k = 0, 1, \ldots, N-1$$

The FIG. 4 also shows a post-processor 403 with the length-N CFFT output Z as input, and the output R and t in rx/tx mode, or the output $R_1$ and $R_2$ in rx/rx mode, or the output $t_1$ and $t_2$ in tx/tx mode. Pre- and post-processing are based on the following properties of the discrete Fourier transform:
- the discrete Fourier transform of an even and purely real-valued sequence is even and purely real-valued;
- the discrete Fourier transform of an even and purely imaginary-valued sequence is even and purely imaginary-valued;
- the discrete Fourier transform of an odd and purely real-valued sequence is odd and purely imaginary-valued;
- the discrete Fourier transform of an odd and purely imaginary-valued sequence is odd and purely real-valued.

Detailed Exemplifying Pre-/Post Processing in Rx/Rx Mode

Figure 6:
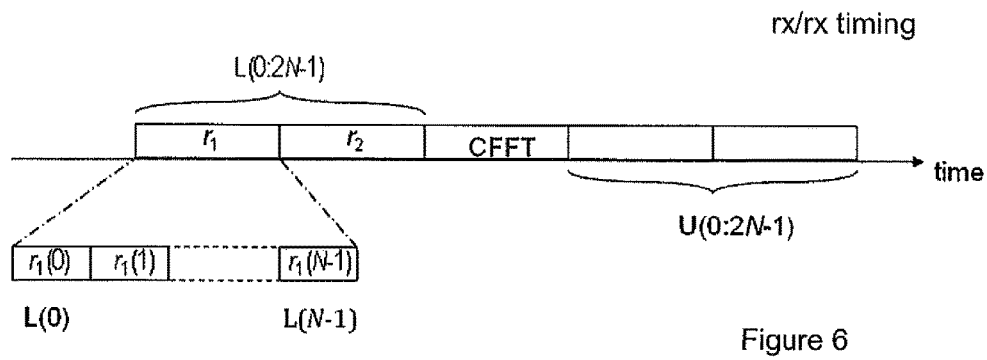
FIG. 6 depicts a timing diagram for simultaneous processing of two receive blocks, i.e. in rx/rx mode, by the transceiver depicted in FIG. 4.

FIG. 6 depicts the timing of simultaneous processing of two consecutive receive blocks (rx/rx mode). However, the receive blocks do not necessarily need to be received in a direct consecutive order. L(0) to L(2N−1) denotes the 2N time instants before the CFFT processing begins. During this time, the two time-domain receive blocks are arranged and loaded into the CFFT block. U(0) to U(2N−1) denotes the 2N time instants after CFFT processing is completed. During this time, the CFFT output is unloaded and the two frequency-domain receive blocks $R_1$ and $R_2$ are constructed.

Figure 7:
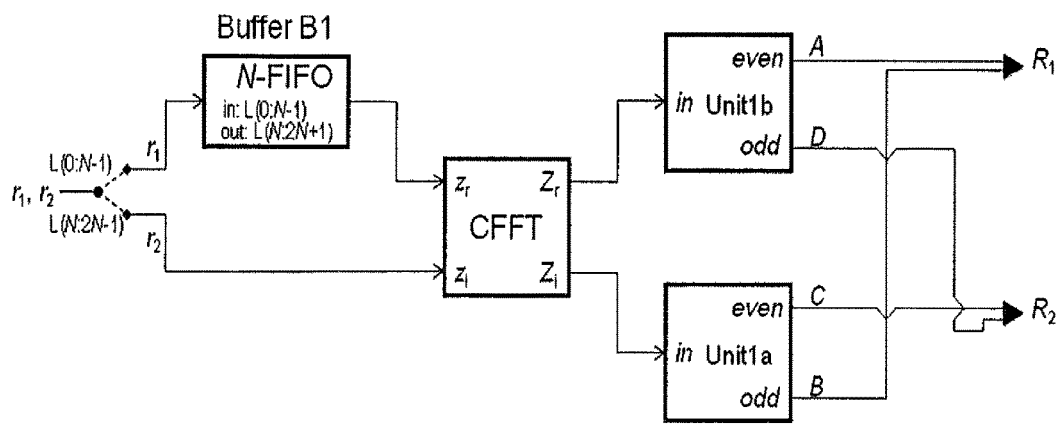
FIG. 7 is a signal-flow diagram illustrating exemplifying computations and corresponding timing for pre- and post-processing of the transceiver in FIG. 4 in rx/rx mode.

FIG. 7 shows an exemplifying signal-flow diagram of the pre-processor and the post-processor 403 shown in FIG. 4 in rx/rx mode. During L(0) to L(N−1), the incoming $r_1$ is written into FIFO buffer B1. During L(N) to L(2N−1), $r_1$ is read from FIFO buffer B1 and loaded together with the incoming $r_2$ as real and imaginary part into the N-point CFFT block. After CFFT processing is completed, real and imaginary CFFT output are processed by even/odd sequence splitters Unit1a and Unit1b to yield the length-(N/2+1) sequences A (even) and D (negative odd) as well as C (even) and B (odd), respectively. The frequency-domain receive blocks are given by $R_1 = A + jB$ and $R_2 = C − jD$.

Figures 8A, 8B:
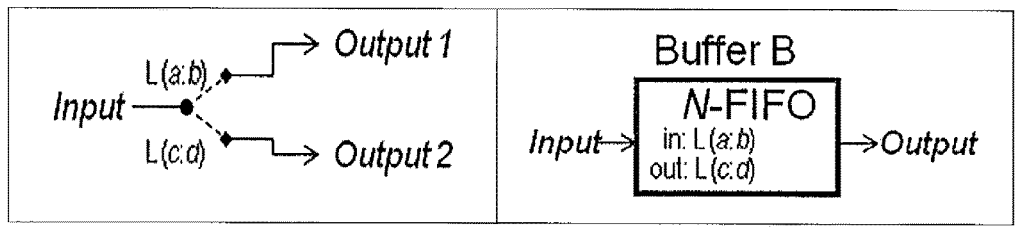
FIGS. 8a-b illustrates the functions of different components in the signal-flow diagram of FIG. 7 in more detail.

FIG. 8a shows a signal switch, as the one illustrated in FIG. 7. The signal switch is configured to rout Input to Output 1 from, and including, time instant L(a), till, and including, time instant L(b) and further to rout Input to Output 2 from, and including, time instant L(c) till, and including, time instant L(d).

FIG. 8b shows a FIFO (First-In First-Out) signal buffer for N real-valued samples, as the one illustrated as buffer B1 in FIG. 7. The FIFO signal buffer for N real-valued samples is configured to store Input from, and including, time instant L(a) till, and including, time instant L(b), and further configured to write the buffer contents to Output from, and including, time instant L(c) till, and including, time instant L(d).

FIG. 9a shows the signal-flow diagram of the even/odd sequence splitter Unit1a used in FIG. 7. Unit1a computes the length-(N/2+1) half of the even part (passed on through output "even") and the length-(N/2+1) half of the odd part (passed on through output "odd") of the length-N input (fed in through input "in"). During U(0) to U(N/2−1), the first half (N/2 samples) of the input sequence are stored in the FILO buffer B11. During U(N/2+1) to U(N−1), the second half of the incoming input sequence is added to and subtracted from the output of the FILO buffer B11 which yields, after multiplication by ½ (left shift by one bit in fixed-point implementation) the even and the odd part of the incoming sequence, respectively, in reversed order. During U(N/2) to U(N−1), the even part in reversed order is written into FILO buffer B12. The first element of the even sequence part is always equal to the first element of the input and thus read out of FILO buffer B11 and passed directly to the output at U(N). The last element of the even sequence part, read out of FILO buffer B12 at U(3N/2) is always equal to the (N/2+1)st input sample and thus directly written into B12 at U(N). Reading the FILO buffer B12 during U(N+1) to U(3N/2−1) yields the rest of the even part. During U(N/2+1) to U(N−1), the odd part in reversed order is written into FILO buffer B13. The first and the last element of the odd sequence part is always zero and is thus written out as constant at U(N) and U(3N/2). Reading the FILO buffer B13 during U(N+1) to U(3N/2−1) yields the (non-zero) rest of the odd part.

FIG. 9b shows the signal-flow diagram of Unit 1b used in FIG. 7. Unit 1b is identical to Unit1a except that it computes the negative odd part (passed on through output "odd") of the length-N input (fed in through input "in").

Figure 10:
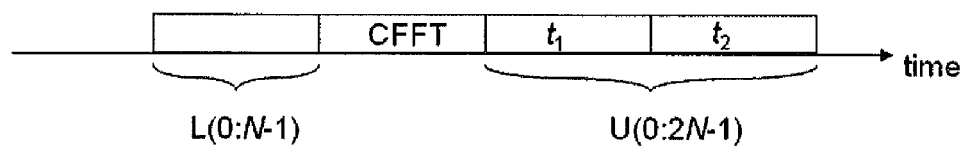
FIG. 10 depicts a timing diagram for simultaneous processing of two transmit blocks in tx/tx mode by the transceiver depicted in FIG. 4.

Detailed Exemplifying Pre-/Post-Processinq in Tx/Tx Mode:

FIG. 10 depicts the timing of simultaneous processing of two consecutive transmit blocks (tx/tx mode). L(0) to L(N−1) denotes the N time instants before the CFFT processing begins. During this time, the two frequency-domain transmit blocks $T_1$ and $T_2$ are pre-processed and loaded into the CFFT block. U(0) to U(2N−1) denotes the 2N time instants after CFFT processing is completed. During this time, the CFFT output is unloaded and the two time-domain transmit blocks $t_1$ and $t_2$ are constructed.

Figure 11:
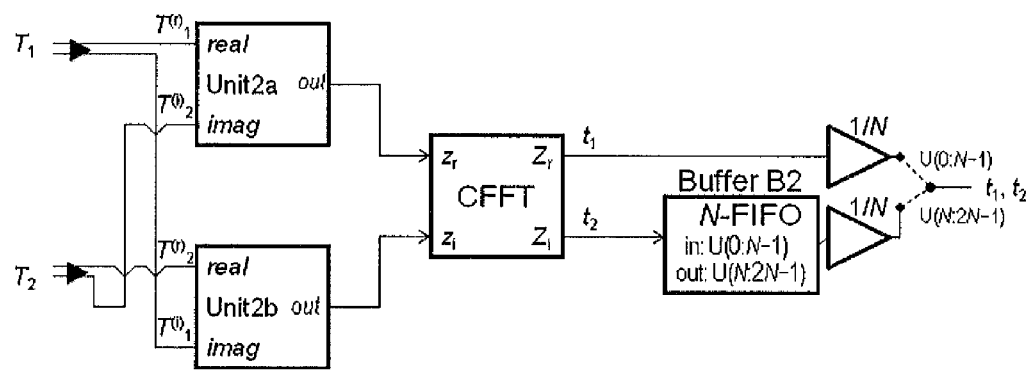
FIG. 11 is a signal-flow diagram illustrating exemplifying computations and corresponding timing for pre- and post-processing of the transceiver of FIG. 4 in tx/tx mode.

FIG. 11 shows an exemplifying signal-flow diagram of the pre-processor 401 and the post-processor 403 shown in FIG. 4 in tx/tx mode. During L(0) to L(N−1), the real part of $T_1$ and imaginary part of $T_2$ are processed by a unit Unit2a that performs Hermitian extension and computes the sum of extended real and imaginary part yielding the real part of the CFFT input. During L(0) to L(N−1), the real part of $T_2$ and imaginary part of $T_1$ are processed by Unit2b performing Hermitian extension and computing difference of extended real and imaginary part yielding the imaginary part of the CFFT input. During U(0) to U(N−1), the real part of the CFFT output divided by N (left shift by log 2(N) bits) yields the transmit block $t_1$ while the imaginary part of the CFFT output is written into the FIFO buffer B2. During U(N) to U(2N−1), the contents of FIFO buffer B2 is read out and divided by N (left shift by log 2(N) bits in fixed-point implementation) yielding transmit block $t_2$.

FIG. 12a shows the signal-flow diagram of Unit2a shown in FIG. 11. Unit2a performs Hermitian extension of its length-(N/2+1) real input and its length-(N/2+1) imaginary input and subsequently add imaginary part and real part yielding the length-N, i.e. N-point, output. During L(0) to L(N/2), the first N/2+1 output samples are computed as sum between real and imaginary part. During L(1) to L(N/2−1), real and negative imaginary part are written into FILO buffers B21 and B22, respectively. During L(N/2+1) to L(N−1), FILO buffers B21 and B22 are read and added, which yields the sum of the Hermitian extension of the inputs for the remaining N/2−1 output samples. FIG. 12b shows the signal-flow diagram of Unit2b used in FIG. 11. Unit2b is identical to Unit2a except that it subtracts imaginary part from real part yielding the length-N output.

Detailed Exemplifying Pre-/Post-Processinq in Rx/Tx Mode

Figure 13:
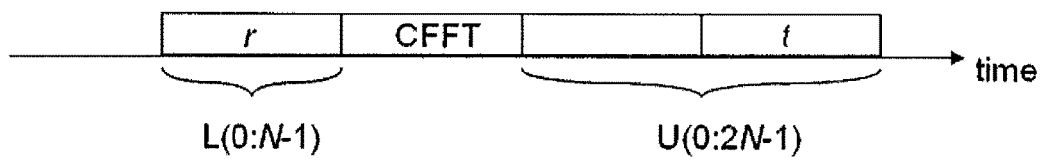
FIG. 13 depicts a timing diagram for simultaneous processing of one receive block and one transmit block in rx/tx mode by the transceiver depicted in FIG. 4.

FIG. 13 depicts the timing of simultaneous processing of a receive block and a transmit block (rx/tx mode). L(0) to L(N−1) denotes the N time instants before the CFFT processing begins. During this time, the receive block r and a transmit block Tare pre-processed and loaded into the CFFT block. U(0) to U(2N−1) denotes the 2N time instants after CFFT processing is completed. During this time, the CFFT output is unloaded and the time-domain transmit block t and the frequency-domain receive block Rare constructed.

Figure 14:
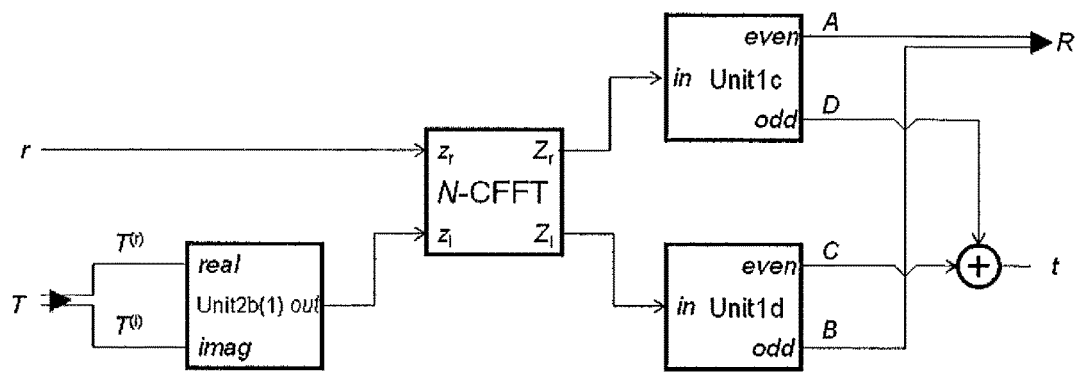
FIG. 14 is a signal-flow diagram illustrating exemplifying computations and corresponding timing for pre- and post-processing of the transceiver of FIG. 4 in rx/tx mode.

FIG. 14 shows an exemplifying signal-flow diagram of the pre-processor 401 and the post-processor 403 shown in FIG. 4 in rx/tx mode. During L(0) to L(N−1), r is loaded as real input into the CFFT while another instance of Unit2b, referred to as Unit2b(1) in FIG. 14, performs Hermitian extension of T and computes the difference between its real and its imaginary part yielding the imaginary part of the CFFT input. After CFFT processing is completed, real and imaginary CFFT output are processed by even/odd sequence splitters Unit1c and Unit1d, respectively. Unit1c computes the length-(N/2+1) sequence A (even part of real FFT output) and the length-N sequence D (extended odd part of real FFT output). Unit1d computes the length-(N/2+1) sequence B (odd part of imaginary FFT output) and the length-N sequence C (extended even part of imaginary FFT output). The frequency-domain receive block is given by R=A+jB and the time-domain transmit block t is given by the sum t=C+D.

Figure 15:
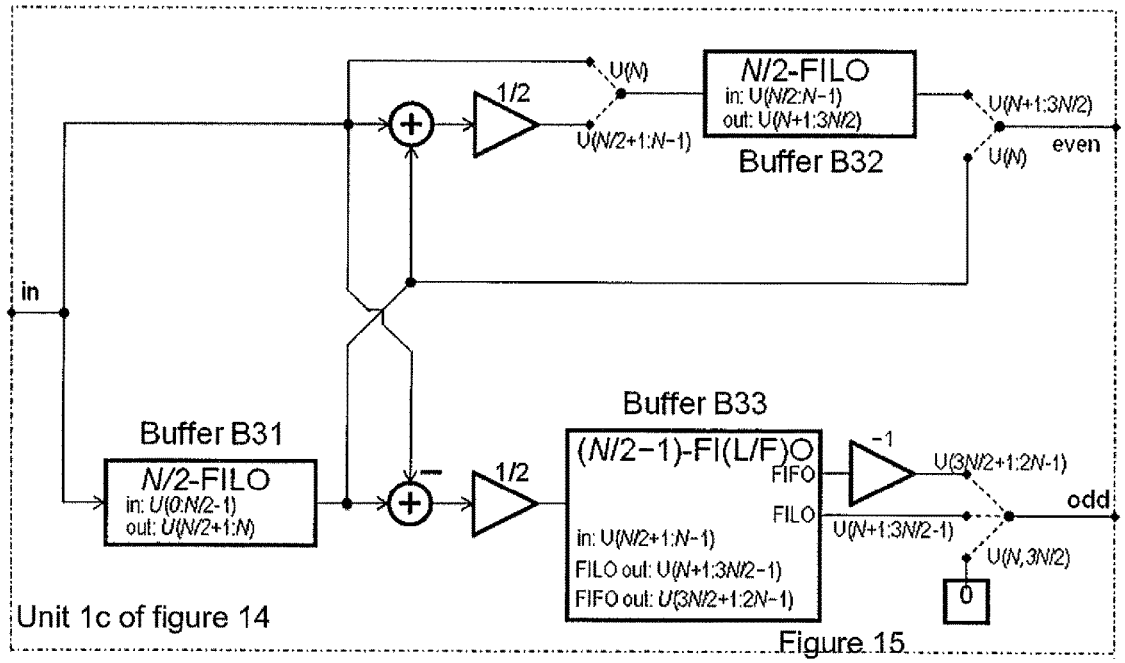
FIG. 15 is a signal-flow diagram illustrating computations and corresponding timing of Unit1c shown in FIG. 14.

FIG. 15 shows the signal-flow diagram of the even/odd sequence splitter Unit1c used in FIG. 14. Similarly to Unit1a, Unit1c computes the length-(N/2+1) half of the even part of its input and the, entire, length-N odd part of its input. Unit1c is identical to Unit1a except for Buffer B33, which is read twice: first in reversed order (FILO) and then in order of writing (FIFO). During U(3N/2) till U(2N−1), the multiplication with −1 (two's complement in fixed-point implementation) yields the second (extended) half of the odd part of the input.

Figure 16:
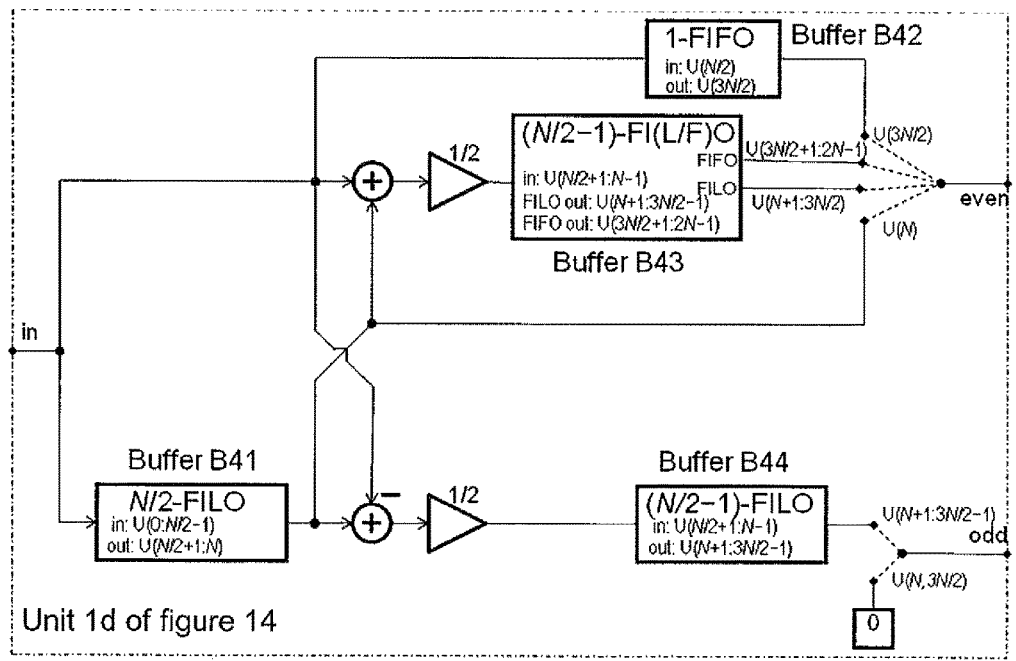
FIG. 16 is a signal-flow diagram illustrating computations and corresponding timing of Unit1d shown in FIG. 14.

FIG. 16 shows the signal-flow diagram of the even/odd sequence splitter Unit1d used in FIG. 14. Similarly to Unit1a, Unit1d computes the length-(N/2+1) half of the odd part of its input and the (entire) length-N even part of its input. Unit1d is identical to Unit1a except for buffers B42 and B43. Buffer B43 is read twice: first in reversed order (FILO) and then in order of writing (FIFO). The (N/2+1)st sample of the even part of the input is equal to the (N/2+1)st sample of the input and is stored in buffer B42 at U(N/2) until needed at U(3N/2).

Figure 17:
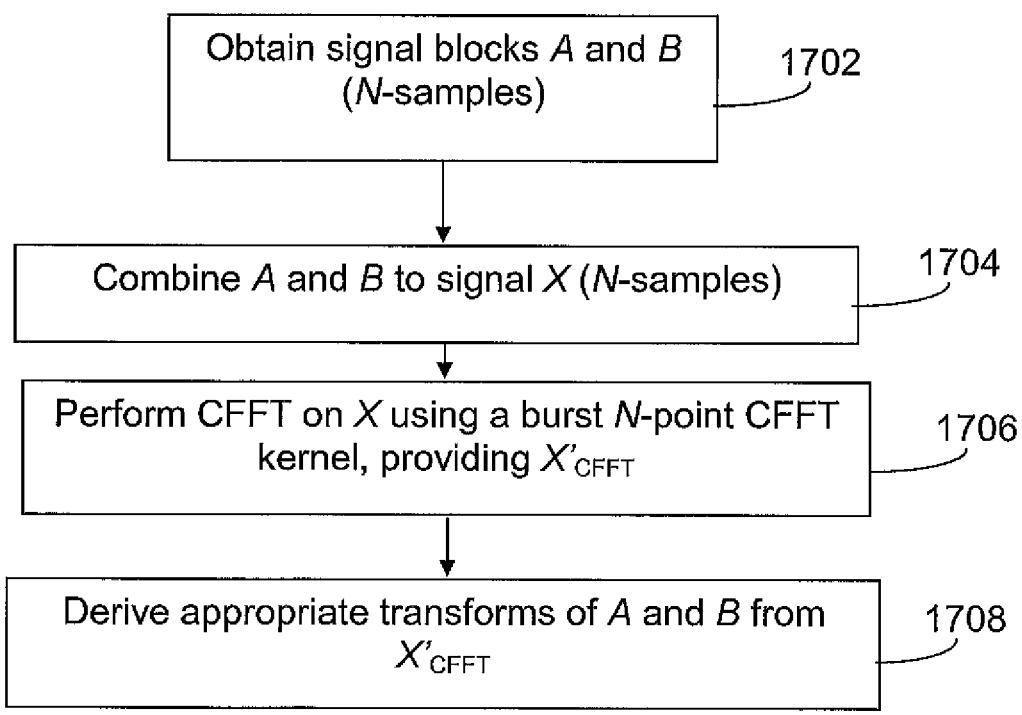
FIG. 17 is a flow chart illustrating a procedure according to an exemplifying embodiment.

Exemplifying Procedure, FIG. 17

Above, an implementation of an exemplifying embodiment of the herein described solution has been described in detail. Below, an exemplifying procedure for baseband processing of signals associated with TDD multicarrier communication over one or more wire lines will be described with reference to FIG. 17 in a more general manner. The procedure is assumed to be performed by a transceiver or transceiving node in a communication system, such as e.g. xDSL employing DMT. The wire line or lines may be assumed to be metallic, e.g. copper, cables, such as e.g. twisted pair, CAT 5, coaxial cables or galvanic connections, such as e.g. backplane busses, on-board inter-chip connection busses, or similar.

A pair of signal blocks, A and B, is assumed to be obtained in an action 1702. A and B each comprises N samples or points. Each of the two blocks A and B is either a real-valued N-sample time-domain receive signal block, $r_n$, or a complex Hermitian-symmetric N-sample frequency-domain transmit signal block $T_k$. The two signal blocks, A and B are combined in an action 1704, into a signal X, comprising N complex points or samples. Actions 1702 and 1704 are referred to as pre-processing earlier in the description. Then, a complex FFT is performed in an action 1706 on the signal X using a single burst I/O N-point complex FFT kernel, thus providing a signal $X'_{CFFT}$ comprising N complex points or samples. Then, an N-point discrete Fourier transform or N-point inverse discrete Fourier transform, A' and B' are derived, in an action 1708, for the signal blocks A and B, from the signal $X'_{CFFT}$. That is, the appropriate transforms of A and B are derived in accordance with the character of A and B, i.e. an N-point discrete Fourier transform R is derived from $X'_{CFFT}$ for a receive block r, and an N-point inverse discrete Fourier transform t is derived from $X'_{CFFT}$ for a complex Hermitian-symmetric N-sample frequency-domain transmit signal block T, as previously described.

The combining and deriving actions depend on the input blocks A and B. In case A and B are time-domain receive blocks $r_1$ and $r_2$, i.e. in rx/rx mode, the combining 1704 involves arranging $r_1$ as the real part of the signal X, and $r_2$ as the imaginary part of the signal X. This may also be expressed e.g. as deriving the real part of the signal X as $r_1$ and deriving the imaginary part of the signal X as $r_2$. That is, in rx/rx mode, X will have a real part, originating from $r_1$, and an imaginary part originating from $r_2$. In rx/rx mode, when A and B are time-domain receive blocks $r_1$ and $r_2$, having Fourier transforms $R_1$ and $R_2$, the deriving 1708 involves deriving a real part of $R_1$ as the even part of the real part of the signal $X'_{CFFT}$; and deriving the imaginary part of $R_1$ as the odd part of the imaginary part of the signal $X'_{CFFT}$. The deriving in rx/rx mode further involves deriving the real part of $R_2$ as the even part of the imaginary part of the signal $X'_{CFFT}$ and deriving the imaginary part of $R_2$ as the negative odd part of the real part of the signal $X'_{CFFT}$.

In case A and B are frequency-domain transmit blocks $T_1$ and $T_2$, i.e. in tx/tx mode, the combining 1704 involves computing the real part of the signal X as the sum of the real part of the Hermitian symmetric extension of $T_1$ and the imaginary part of the Hermitian symmetric extension of $T_2$. The combining 1704 further involves computing the imaginary part of the signal X as the difference of the real part of the Hermitian symmetric extension of $T_2$ and the imaginary part of the Hermitian symmetric extension of $T_1$. In tx/tx mode, when A and B are frequency-domain transmit blocks $T_1$ and $T_2$ having inverse Fourier transforms $t_1$ and $t_2$, the deriving 1708 involves deriving $t_1$ as the real part of the signal $X'_{CFFT}$, possibly multiplied by an appropriate scaling factor, for example, 1/N, and deriving $t_2$ as the imaginary part of the signal $X'_{CFFT}$, possibly multiplied by an appropriate scaling factor, for example, 1/N.

In case one of A and B is a time-domain receive block, r, having a Fourier transform R, and the other a frequency-domain transmit block T, having an inverse Fourier transform t, i.e. in rx/tx mode, the combining 1704, and thereby also the deriving 1708, may be done in different ways, e.g. depending on the order of the blocks or latency considerations. For example, the combining may involve arranging r as the real part of the signal X and, computing the imaginary part of the signal X as the difference of the real part and imaginary part of the Hermitian symmetric extension of T. The deriving 1708 would then involve, computing real and imaginary part of R as even and odd part of real and imaginary part of the signal $X'_{CFFT}$, respectively; and further computing t as sum of even part of the imaginary part of $X'_{CFFT}$ and odd part of real part of $X'_{CFFT}$, possibly followed by multiplication with a scaling factor. For the definition of the FFT Z(k) of z(n) presented above, an appropriate scaling in the sense that the IFFT of the FFT of a signal x yields x is factor 1/N (power-preserving FFT/IFFT pair). Other scaling factors may be preferred depending e.g. on the definition of the FFT and implementation considerations such as numerical precision.

Alternatively, in rx/tx mode, the combining could involve computing the real part of the signal X as the sum of the real part of the Hermitian symmetric extension of T and the odd part of r, and further computing the imaginary part of the signal X as the difference of the even part of r and the imaginary part of the Hermitian symmetric extension of T. The deriving 1708 would then involve computing real and imaginary part of R as even and odd part of the imaginary part of the signal $X'_{CFFT}$, respectively; and arranging the real part $X'_{CFFT}$, possibly multiplied with an appropriate scaling factor, such as 1/N, as t. Again, this could also be expressed as: deriving t as the real part of the signal $X'_{CFFT}$, possibly multiplied, etc.

Another alternative in rx/tx mode is that the combining could involve computing the real part of the signal X as the sum of the imaginary part of the Hermitian symmetric extension of T and the even part of r, and further computing the imaginary part of the signal X as the difference of the real part of the Hermitian symmetric extension of T and the odd part of r. The deriving 1708 would then involve computing real and imaginary part of R as even and odd part of the real part of the signal $X'_{CFFT}$, respectively; and arranging the imaginary part of $X'_{CFFT}$, possibly multiplied with an appropriate scaling factor, e.g. 1/N, as t.

Yet another alternative in rx/tx mode is that the deriving 1704 involves computing the real part of the signal X as the difference of the real part and imaginary part of the Hermitian symmetric extension of T, and arranging r as the imaginary part of the signal X. The deriving 1708 would then involve deriving real and imaginary part of R as even and negative odd part of imaginary and real part of the signal $X'_{CFFT}$, respectively; and further computing t as the difference of the even part of the real part of $X'_{CFFT}$ and odd part of imaginary part of $X'_{CFFT}$, possibly followed by multiplication with an appropriate scaling factor, e.g. 1/N.

As previously described, the procedure above is suitable for use with TDD multicarrier communication over one or more wire lines. The lines may be assumed to be made of metal, such as e.g. copper. The number, N, of samples of the blocks, and thus the size of the performed FFT, may be assumed to be in the order of thousands, e.g. 8192. The procedure is suitable for use in the developing standards for communication, such as G.fast.

Figure 18:
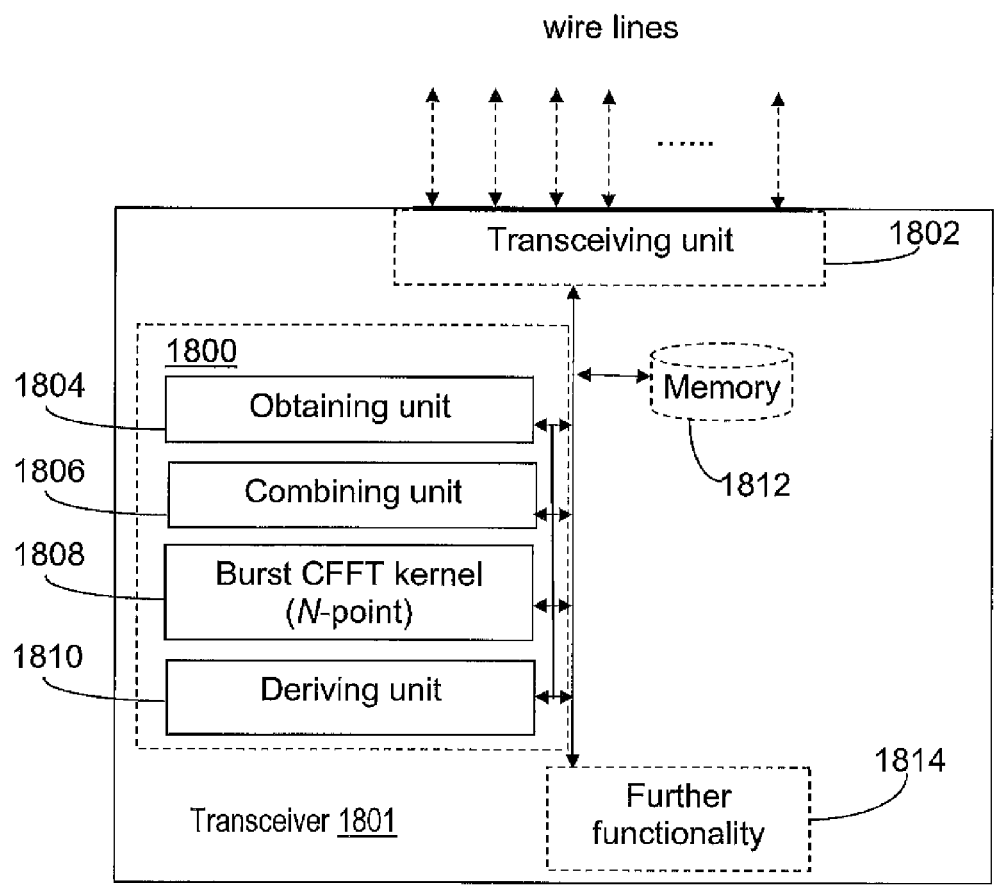
FIG. 18 is a block chart illustrating a transceiver according to an exemplifying embodiment.

Exemplifying Transceiver, FIG. 18

Below, an exemplifying transceiver 1801, adapted to enable the performance of the above described procedure for baseband processing, will be described with reference to FIG. 18. The transceiver 1801 is operable in a communication system using TDD multicarrier communication over one or more wire lines. The transceiver 1801 may be e.g. a DSLAM or a CPE, or some other network node. For example, the transceiver could be base station in a wireless communication system, using one or more wire lines for backhaul. As previously stated, the wire line or lines may be assumed to be metallic, e.g. copper, cables, such as e.g. twisted pair, CAT 5, coaxial cables or galvanic connections, such as e.g. backplane busses, on-board inter-chip connection busses, or similar The transceiver 1801 is illustrated as to communicate over wire lines using a communication unit, or line driver unit, 1802, comprising a receiver 1804 and a transmitter 1803. The transceiver 1801 may comprise functional units 1814, such as e.g. functional units providing regular communication functions, and may further comprise one or more storage units 1812.

The arrangement 1800 or transceiver 1801, or parts thereof, could be implemented e.g. by one or more of: dedicated hardware elementary processing units, such as transistors, logic gates, etc., realized as integrated circuits or discrete components; a Programmable Logic Device (PLD), such as FPGA or ASIC; a processor or a micro processor and adequate software and memory for storing thereof, or other electronic component(s) or processing circuitry configured to perform the actions described above.

The transceiver 1801 could be described and illustrated as comprising an obtaining unit, adapted to obtain the signal blocks A and B, which are to be processed. Receive signal blocks, r, may be received, e.g. from another entity or network node via the unit 1802, and transmit signal blocks, T, which are to be transmitted over the wire lines, may be received from a baseband part of the device 1801.

The transceiver 1801 comprises a combining unit, 1806, adapted to combine the two signal blocks, A and B, into a signal X comprising N complex points. The two blocks A and B each comprises N samples, and is either a real-valued time-domain receive signal block r, or a complex Hermitian-symmetric frequency-domain transmit signal block T. The transceiver 1801 further comprises a burst I/O N-point complex FFT kernel 1808, adapted to perform a complex FFT on the signal X, thus providing a signal $X'_{CFFT}$ comprising N complex points. The transceiver 1801 further comprises a deriving unit 1810, adapted to derive an N-point discrete Fourier transform or N-point inverse discrete Fourier transform, A' and B', for the signal blocks A and B, from the signal $X'_{CFFT}$. It should be noted that the deriving does not involve any performing of an FFT or IFFT.

Figure 19:
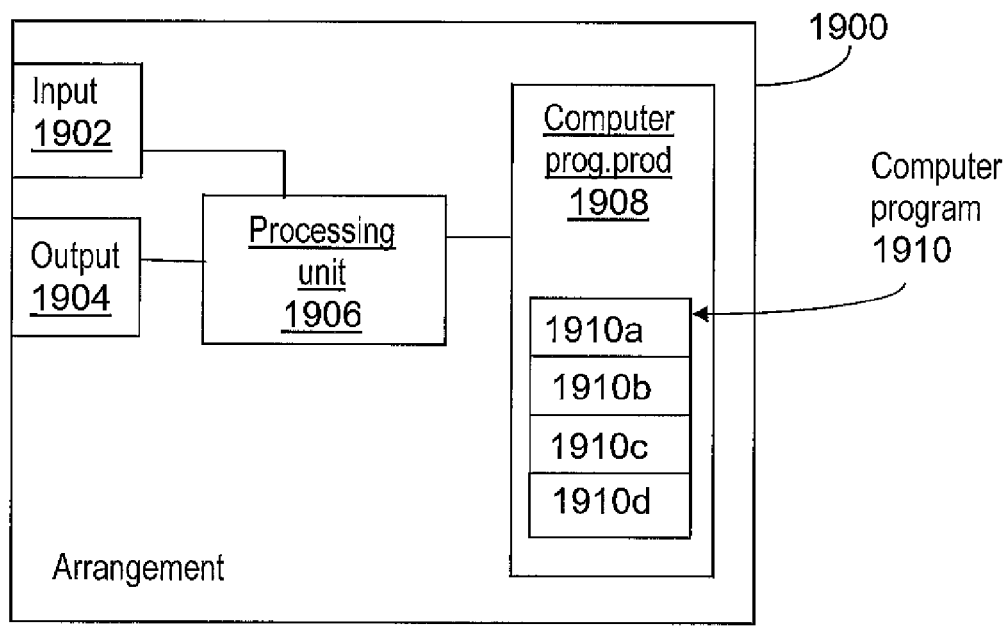
FIG. 19 is a block chart illustrating an arrangement according to an exemplifying embodiment.

Exemplifying Arrangement, FIG. 19

FIG. 19 schematically shows a possible embodiment of an arrangement 1900, which also can be an alternative way of disclosing an embodiment of the arrangement 1800 in the transceiver 1801 illustrated in FIG. 18, or part thereof. Comprised in the arrangement 1900 are here a processing unit 1906, e.g. with a DSP (Digital Signal Processor). The processing unit 1906 may be a single unit or a plurality of units to perform different actions of procedures described herein. The processing unit may comprise a burst I/O N-point complex FFT kernel, e.g. in form of a dedicated integrated circuit. The arrangement 1900 may also comprise an input unit 1902 for receiving signals from other entities or nodes, and an output unit 1904 for providing signals to other entities or nodes. The input unit 1002 and the output unit 1004 may be arranged as an integrated entity.

Furthermore, the arrangement 1900 comprises at least one computer program product 1908 in the form of a memory, e.g. an EEPROM (Electrically Erasable Programmable Read-Only Memory), a flash memory and a hard drive. The computer program product 1908 comprises a computer program 1910, which comprises code means, which when executed in the processing unit 1906 in the arrangement 1900 causes the arrangement and/or a node in which the arrangement is comprised to perform the actions e.g. of the procedure described earlier in conjunction with FIG. 17.

The computer program 1910 may be configured as a computer program code structured in computer program modules. Hence, in an exemplifying embodiment, the code means in the computer program 1910 of the arrangement 1900 may comprise an obtaining module 1910*a* for obtaining a signal block. The arrangement 1900 may further comprise a combining module 1910*b* for combining two signal blocks, as described above.

The computer program may further comprise a deriving module 1910*c* for deriving an N-point discrete Fourier transform or and N-point inverse discrete Fourier transform for the two signal blocks, as described above. The computer program 1910 may further comprise one or more additional modules 1910*d*, e.g. a burst I/O N-point complex FFT kernel for providing the FFT. However, in a preferred solution, the FFT is performed by dedicated hardware.

Although the code means in the embodiment disclosed above in conjunction with FIG. 19 are implemented as computer program modules which when executed in the processing unit causes the arrangement or transceiver to perform the actions described above in the conjunction with figures mentioned above, at least one of the code means may in alternative embodiments be implemented at least partly as hardware circuits.

As previously mentioned, the processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the transceiver 1801.

While the method and network node or arrangement for baseband processing as suggested above has been described with reference to specific embodiments provided as examples, the description is generally only intended to illustrate the suggested technology and should not be taken as limiting the scope of the suggested methods and arrangements, which are defined by the appended claims. While described in general terms, the method and arrangement may be applicable e.g. for different types of communication systems applying multicarrier TDD over wire lines.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions. It should also be noted that the units or modules described in this disclosure are to be regarded as logical entities and not with necessity as separate physical entities.

ABBREVIATIONS

DMT discrete multi-tone
DFT discrete Fourier transform
FFT fast Fourier transform
IFFT inverse FFT
I/O input/output
OFDM orthogonal frequency-division multiplexing
TDD time division duplexing.

APPENDIX

Notation and exemplifying pre/post processing apparatus functions are described here.
Notation:
Lower-case and uppercase symbols denote time-domain and frequency-domain points, respectively. $\Re(\cdot)$ and $\Im(\cdot)$ denote real and imaginary part of $(\cdot)$, respectively. $(\cdot)^*$ denotes the complex conjugate of $(\cdot)$.
The following symbols are used:
N block length (No. of time-domain samples)
$r_n$, n=0, 1, ..., N–1 real-valued length-N time-domain receive block
$R_k$, k=0, 1, ..., N–1 N-point discrete Fourier transform (DFT) of $r_n$;

$$R_k = \sum_{n=0}^{N-1} r_n e^{-j2\pi kn/N}, k = 0, 1, \ldots, N-1 \quad (1)$$

$T_k$, k=0, 1, ..., N–1 Hermitian-symmetric length-N frequency-domain transmit block ($T_k = T^*_{N-k}$)
$t_n$, n=0, 1, ..., N–1 N-point inverse DFT of $T_k$;

$$t_n = \frac{1}{N}\sum_{k=0}^{N-1} T_k e^{j2\pi kn/N}, n = 0, 1, \ldots, N-1 \quad (2)$$

$z_n$, n=0, 1, ..., N–1 CFFT input (N complex points)
$Z_k$, k=0, 1, ..., N–1 CFFT output (N complex points)
Processing:
1) Pre-processing: Compute $$z_n = \Re(T_n) + \tfrac{1}{2}(r_n - r_{N-n}) + j(-\Im(T_n) + \tfrac{1}{2}(r_n + r_{N-n})), \quad n=0,1\ldots,N-1 \quad (3)$$

2) FFT: Compute the N-point DFT Z of z using the CFFT kernel:

$$Z_k = \sum_{n=0}^{N-1} z_n e^{-j2\pi kn/N}, k = 0, 1, \ldots, N-1 \quad (4)$$

3) Post-processing: Compute $$R_k = \frac{1}{2}(\Im(Z_k) + \Im(Z_{N-k}) + j(\Im(Z_k) - \Im(Z_{N-k}))), \quad (5)$$
$$k = 0, 1, \ldots, N-1$$

$$t_n = \frac{1}{N}\Re(Z_n), n = 0, 1, \ldots, N-1 \quad (6)$$

As can be seen, pre/post processing may be achieved by subtractions and shifts only (div ½, 1/N). The architecture is very hardware friendly.

The invention claimed is:

1. A method, in a transceiver, for baseband processing of signals associated with Time Division Duplexing (TDD) multicarrier communication over one or more wire lines, the method comprising:
combining two signal blocks, A and B, each comprising N samples, into a signal X comprising N complex points, wherein each of the two blocks is either a real-valued N-sample time-domain receive signal block rn, or a complex Hermitian-symmetric N-sample frequency-domain transmit signal block $T_k$;
performing a complex FFT on the signal X using a single, burst-I/O, N point, complex FFT kernel, thus providing a signal $X'_{CFFT}$ comprising N complex points; and
deriving an N-point discrete Fourier transform or N-point inverse discrete Fourier transform, A' and B', for the signal blocks A and B, from the signal $X'_{CFFT}$.

2. The method of claim 1, wherein the combining comprises:
when A and B are time-domain receive blocks $r_1$ and $r_2$:
arranging $r_1$ as the real part of the signal X, and $r_2$ as imaginary part of the signal X;
when A and B are frequency-domain transmit blocks $T_1$ and $T_2$:
computing the real part of the signal X as the sum of the real part of the Hermitian symmetric extension of $T_1$ and the imaginary part of the Hermitian symmetric extension of $T_2$, and
computing the imaginary part of the signal X as the difference of the real part of the Hermitian symmetric extension of $T_2$ and the imaginary part of the Hermitian symmetric extension of $T_1$; and,
when one of A and B is a time-domain receive block, r, and the other a frequency-domain transmit block T, one of the following four alternatives:
i) arranging r as the real part of the signal X and computing the imaginary part of the signal X as the difference of the real part and imaginary part of the Hermitian symmetric extension of T;
ii) computing the real part of the signal X as the sum of the real part of the Hermitian symmetric extension of T and the odd part of r, and computing the imaginary part of the signal X as the difference of the even part of r and the imaginary part of the Hermitian symmetric extension of T;
iii) computing the real part of the signal X as the sum of the imaginary part of the Hermitian symmetric extension of T and the even part of r, and computing the imaginary part of the signal X as the difference of the real part of the Hermitian symmetric extension of T and the odd part of r;
iv) computing the real part of the signal X as the difference of the real part and imaginary part of the Hermitian symmetric extension of T, and arranging r as the imaginary part of the signal X.

3. The method of claim 1, wherein the deriving comprises:
when A and B are time-domain receive blocks $r_1$ and $r_2$ having Fourier transforms $R_1$ and $R_2$:
deriving real and imaginary part of $R_1$ as even and odd part of real and imaginary part of the signal $X'_{CFFT}$, respectively, and
deriving real and imaginary part of $R_2$ as even and negative odd part of imaginary and real part of the signal $X'_{CFFT}$, respectively;
when A and B are frequency-domain transmit blocks $T_1$ and $T_2$ having inverse Fourier transforms $t_1$ and $t_2$:
deriving $t_1$ as the real part of the signal $X'_{CFFT}$ multiplied by a scaling factor $c_{IFFT}$, and
deriving $t_2$ as the imaginary part of the signal $X'_{CFFT}$ multiplied the scaling factor $c_{IFFT}$;
when one of A and B is a time-domain receive block, r having a Fourier transform R, and the other is a frequency-domain transmit block T, having an inverse Fourier transform t, one of the following four alternatives:
i) computing real and imaginary part of R as even and odd part of real and imaginary part of the signal $X'_{CFFT}$, respectively, and
computing t as sum of even part of the imaginary part of $X'_{CFFT}$ and odd part of real part of $X'_{CFFT}$ followed by multiplication with the scaling factor $c_{IFFT}$;
ii) computing real and imaginary part of R as even and odd part of the imaginary part of the signal $X'_{CFFT}$, respectively, and
deriving t as the real part of $X'_{CFFT}$ multiplied with the scaling factor $c_{IFFT}$;
iii) computing real and imaginary part of R as even and odd part of the real part of the signal $X'_{CFFT}$, respectively, and
deriving t as the imaginary part of $X'_{CFFT}$ multiplied with the scaling factor $c_{IFFT}$;
iv) computing real and imaginary part of R as even and negative odd part of imaginary and real part of the signal $X'_{CFFT}$, respectively, and
computing t as difference of the even part of the real part of $X'_{CFFT}$ and odd part of imaginary part of $X'_{CFFT}$ followed by multiplication with the scaling factor $c_{IFFT}$.

4. The method of claim 1, wherein the deriving comprises:
when A and B are time-domain receive blocks $r_1$ and $r_2$ having Fourier transforms $R_1$ and $R_2$:
deriving real and imaginary part of $R_1$ as even and odd part of real and imaginary part of the signal $X'_{CFFT}$, respectively, and
deriving real and imaginary part of $R_2$ as even and negative odd part of imaginary and real part of the signal $X'_{CFFT}$, respectively;
when A and B are frequency-domain transmit blocks $T_1$ and $T_2$ having inverse Fourier transforms $t_1$ and $t_2$:
deriving $t_1$ as the real part of the signal $X'_{CFFT}$, and
deriving $t_2$ as the imaginary part of the signal $X'_{CFFT}$;
when one of A and B is a time-domain receive block, r having a Fourier transform R, and the other is a frequency-domain transmit block T, having an inverse Fourier transform t, one of the following four alternatives:
i) computing real and imaginary part of R as even and odd part of real and imaginary part of the signal $X'_{CFFT}$, respectively, and
computing t as sum of even part of the imaginary part of $X'_{CFFT}$ and odd part of real part of $X'_{CFFT}$;
ii) computing real and imaginary part of R as even and odd part of the imaginary part of the signal $X'_{CFFT}$, respectively, and
deriving t as the real part of $X'_{CFFT}$;
iii) computing real and imaginary part of R as even and odd part of the real part of the signal $X'_{CFFT}$, respectively, and
deriving t as the imaginary part of $X'_{CFFT}$;
iv) computing real and imaginary part of R as even and negative odd part of imaginary and real part of the signal $X'_{CFFT}$, respectively, and
computing t as difference of the even part of the real part of $X'_{CFFT}$ and odd part of imaginary part of $X'_{CFFT}$.

5. The method of claim 1, wherein the TDD multicarrier communication is performed over one or more wire lines of metal.

6. The method of claim 1, wherein the method is performed in a communication system operating according to communication standard G.fast.

7. A transceiver for baseband processing of signals associated with Time Division Duplexing (TDD) multicarrier communication over one or more wire lines, the transceiver comprising:
a combining circuit, adapted to combine two signal blocks, A and B, each comprising N samples, into a signal X comprising N complex points, wherein each of the two blocks A and B is either a real-valued N-sample time-domain receive signal block $r_n$, or a complex Hermitian-symmetric N-sample frequency-domain transmit signal block $T_k$;
a burst-I/O, N-point, complex FFT kernel, adapted to perform a complex FFT on the signal X, thus providing a signal $X'_{CFFT}$ comprising N complex points; and
a deriving circuit, adapted to derive an N-point discrete Fourier transform or N-point inverse discrete Fourier transform, A' and B', for the signal blocks A and B, from the signal $X'_{CFFT}$.

8. The transceiver of claim 7, wherein the combining circuit is adapted to combine the two signal blocks by:
when A and B are time-domain receive blocks $r_1$ and $r_2$:
arranging $r_1$ as the real part of the signal X, and $r_2$ as imaginary part of the signal X;
when A and B are frequency-domain transmit blocks $T_1$ and $T_2$:
computing the real part of the signal X as the sum of the real part of the Hermitian symmetric extension of $T_1$ and the imaginary part of the Hermitian symmetric extension of $T_2$, and
computing the imaginary part of the signal X as the difference of the real part of the Hermitian symmetric extension of $T_2$ and the imaginary part of the Hermitian symmetric extension of $T_1$; and,
when one of A and B is a time-domain receive block, r, and the other a frequency-domain transmit block T, one of the following four alternatives:
i) arranging r as the real part of the signal X and computing the imaginary part of the signal X as the difference of the real part and imaginary part of the Hermitian symmetric extension of T;
ii) computing the real part of the signal X as the sum of the real part of the Hermitian symmetric extension of T and the odd part of r, and computing the imaginary part of the signal X as the difference of the even part of r and the imaginary part of the Hermitian symmetric extension of T;

iii) computing the real part of the signal X as the sum of the imaginary part of the Hermitian symmetric extension of T and the even part of r, and computing the imaginary part of the signal X as the difference of the real part of the Hermitian symmetric extension of T and the odd part of r;

iv) computing the real part of the signal X as the difference of the real part and imaginary part of the Hermitian symmetric extension of T, and arranging r as the imaginary part of the signal X.

9. The transceiver of claim 7, wherein the deriving circuit is adapted to:

when A and B are time-domain receive blocks $r_1$ and $r_2$ having Fourier transforms $R_1$ and $R_2$:

derive real and imaginary part of $R_1$ as even and odd part of real and imaginary part of the signal $X'_{CFFT}$, respectively, and derive real and imaginary part of $R_2$ as even and negative odd part of imaginary and real part of the signal $X'_{CFFT}$, respectively;

when A and B are frequency-domain transmit blocks $T_1$ and $T_2$ having inverse Fourier transforms $t_1$ and $t_2$:

derive $t_1$ as the real part of the signal $X'_{CFFT}$ multiplied by a scaling factor $c_{IFFT}$, and derive $t_2$ as the imaginary part of the signal $X'_{CFFT}$ multiplied by the scaling factor $c_{IFFT}$;

when one of A and B is a time-domain receive block, r having a Fourier transform R, and the other is a frequency-domain transmit block T, having an inverse Fourier transform t, one of the following four alternatives:

i) compute real and imaginary part of R as even and odd part of real and imaginary part of the signal $X'_{CFFT}$, respectively; and compute t as sum of even part of the imaginary part of $X'_{CFFT}$ and odd part of real part of $X'_{CFFT}$ followed by multiplication with the scaling factor $c_{IFFT}$;

ii) compute real and imaginary part of R as even and odd part of the imaginary part of the signal $X'_{CFFT}$, respectively; and derive t as the real part of $X'_{CFFT}$ multiplied with the scaling factor $c_{IFFT}$;

iii) compute real and imaginary part of R as even and odd part of the real part of the signal $X'_{CFFT}$, respectively; and derive t as the imaginary part of $X'_{CFFT}$ multiplied with the scaling factor $c_{IFFT}$;

iv) compute real and imaginary part of R as even and negative odd part of imaginary and real part of the signal $X'_{CFFT}$, respectively; and compute t as difference of the even part of the real part of X'CFFT and odd part of imaginary part of $X'_{CFFT}$ followed by multiplication with the scaling factor $c_{IFFT}$.

10. The transceiver of claim 7, wherein the deriving circuit is adapted to:

in the event that A and B are time-domain receive blocks $r_1$ and $r_2$ having Fourier transforms $R_1$ and $R_2$:

derive real and imaginary part of $R_1$ as even and odd part of real and imaginary part of the signal $X'_{CFFT}$, respectively, and derive real and imaginary part of $R_2$ as even and negative odd part of imaginary and real part of the signal $X'_{CFFT}$, respectively;

when A and B are frequency-domain transmit blocks $T_1$ and $T_2$ having inverse Fourier transforms $t_1$ and $t_2$:

derive $t_1$ as the real part of the signal $X'_{CFFT}$, and derive $t_2$ as the imaginary part of the signal $X'_{CFFT}$;

when one of A and B is a time-domain receive block, r having a Fourier transform R, and the other is a frequency-domain transmit block T, having an inverse Fourier transform t, one of the following four alternatives:

i) compute real and imaginary part of R as even and odd part of real and imaginary part of the signal $X'_{CFFT}$, respectively; and compute t as sum of even part of the imaginary part of $X'_{CFFT}$ and odd part of real part of $X'_{CFFT}$;

ii) compute real and imaginary part of R as even and odd part of the imaginary part of the signal $X'_{CFFT}$, respectively; and derive t as the real part of $X'_{CFFT}$;

iii) compute real and imaginary part of R as even and odd part of the real part of the signal $X'_{CFFT}$, respectively; and derive t as the imaginary part of $X'_{CFFT}$;

iv) compute real and imaginary part of R as even and negative odd part of imaginary and real part of the signal $X'_{CFFT}$, respectively; and compute t as difference of the even part of the real part of $X'_{CFFT}$ and odd part of imaginary part of $X'_{CFFT}$.

11. The transceiver of claim 7, adapted to perform the TDD multicarrier communication over one or more wire lines of metal.

12. The transceiver of claim 7, wherein the transceiver is adapted for operation in a communication system operating according to communication standard G.fast.

13. A non-transitory computer-readable medium comprising, stored thereupon, a computer program comprising computer readable code that, when run in a transceiver for baseband processing of signals associated with Time Division Duplexing (TDD) multicarrier communication over one or more wire lines, causes the transceiver to:

combine two signal blocks, A and B, each comprising N samples, into a signal X comprising N complex points, wherein each of the two blocks is either a real-valued N-sample time-domain receive signal block $r_n$, or a complex Hermitian-symmetric N-sample frequency-domain transmit signal block $T_k$;

perform a complex FFT on the signal X using a single, burst-I/O, N point, complex FFT kernel, thus providing a signal $X'_{CFFT}$ comprising N complex points; and derive an N-point discrete Fourier transform or N-point inverse discrete Fourier transform, A' and B', for the signal blocks A and B, from the signal $X'_{CFFT}$.

\* \* \* \* \*